2,868,844

SELECTIVE NITRATION PROCESS

Thomas H. Coffield, Birmingham, and Margaret E. Griffing, Detroit, Mich., assignors to Ethyl Corporation, New York, N. Y., a corporation of Delaware No Drawing. Application January 22, 1957
Serial No. 635,122

4 Claims. (Cl. 260—622)

This invention relates to the preparation of valuable organic compounds, namely, 4-nitro-2,6-dialkyl phenols in which the alkyl groups are each branched on the alpha carbon atom.

The present 4-nitro-2,6-dialkyl phenols are exceptionally useful chemical intermediates. For example, these compounds can be reduced or reductively alkylated to form 4-amino, 4-(N-alkylamino)-, and 4-(N,N-dialkylamino)-2,6-dialkyl phenols in which each of the alkyl groups ortho to the hydroxyl group is branched on its alpha carbon atom. These amino compounds are particularly useful as jet fuel thermal stabilizers when dissolved therein in very small amounts. These compounds are also effective antioxidants for use in organic material normally susceptible to deterioration in the presence of air. Thus, they effectively stabilize against atmospheric deterioration such materials as gasoline, lubricating oil, natural and synthetic rubber, high molecular weight polymers (polyethylene, polystyrene, etc.), diesel fuels, and the like. The 4-nitro-2,6-dialkyl phenols are themselves particularly useful in the photographic arts.

The preparation of the present 4-nitro-2,6-dialkyl phenols by nitration procedures has not been possible heretofore. The reason for this is that 2,6-dialkyl phenols in which the alkyl groups are each branched on the alpha carbon atom are readily dealkylated or totally destroyed under conventional nitration reaction conditions. For example, Hart and Cassis, J. Am. Chem. Soc. 73, 3179 (1951), have shown that when 2,6-di-tert-butyl phenol is nitrated with a mixture of nitric and acetic acids, dealkylation occurs with the resultant formation of 2-tert-butyl-4,6-dinitro phenol. It has also been found that in attempting to nitrate such phenols as 2,6-di-tert-butyl phenol with a nitration mixture composed of nitric and sulfuric acids, complete deterioration of the phenol is encountered as evidenced by the formation of large amounts of resins and tars. This finding confirms reports in the literature (e. g., A. C. Fuson, Adv. Org. Chem. 297, John Wiley and Sons, 1953, New York), that the mixed nitric/sulfuric acid nitration of alkylated phenols leads to oxidation and also to the displacement of the alkyl groups with nitro groups.

A completely different situation is presented in the para nitration of ortho alkyl-substituted phenols which are not substituted in each ortho position by an alkyl group that is branched on its alpha carbon atom. Thus, Auwers and Markovits, Berichte 41, 2335 (1908), found that 4-nitro-2,6-dimethyl phenol could be prepared by nitrating 2,6-dimethyl phenol with a mixture of nitric acid and acetic acid. Simliarly, Fileti, Gazz. Chim., Ital. 16, 121 (1886), accomplished the preparation of 4-nitro-2-isopropyl phenol by nitrating ortho isopropyl phenol with mixed nitric and acetic acids. It will be seen, therefore, that the nitration of 2,6-dialkyl phenols of the type dealt with by the present invention is different in kind from the nitration of less hindered ortho alkyl phenols, such as 2,6-dimethyl phenol, 2-isopropyl phenol, and the like. Thus, in seeking more hindered ortho-alkyl 4-nitro phenols, the art has been content with the use of roundabout and highly-complex procedures involving the use of para-nitro phenol as a starting material. For example, Ipatieff, Pines and Friedman, J. Am. Chem. Soc. 60, 2495 (1938), report the preparation of 4-nitro-2-tert-butyl phenol by reacting para-nitro phenol with isobutylene in the presence of excess 90 percent phosphoric acid at 100° C. for four hours, using a closed system. The yields of this process were only 15 percent and it will be noted that only mono ortho alkylation was accomplished.

A novel process of preparing 4-nitro-2,6-dialkyl phenols in which each alkyl group is branched on its alpha carbon atom has now been found which enables the preparation of these compounds in high yield and purity. Thus, a distinct need in the art has now been fulfilled.

An object of this invention is to provide a trouble-free process of preparing 4-nitro-2,6-dialkyl phenols in which each alkyl group is branched on its alpha carbon atom. Another object of this invention is to provide a process of preparing very pure 4-nitro-2,6-dialkyl phenols of this type in high yields. Another object is to avoid dealkylation of these hindered 2,6-dialkyl phenols during the nitration process while at the same time minimizing competing reactions. Other objects of this invention will be apparent from the ensuing description.

According to this invention there is provided the unprecedented process of preparing 4-nitro-2,6-dialkyl phenols in which each alkyl group is branched on its alpha carbon atom and preferably contains no more than about 12 carbon atoms, which comprises nitrating the corresponding 2,6-dialkyl phenol with nitric acid under controlled reaction conditions in the presence of an inert hydrocarbon solvent. It will be evident that the process of this invention represents a marked departure from the work of Hart and Cassis, supra, in that the present process involves the use of an inert hydrocarbon solvent and nitric acid rather than a nitration mixture of nitric and acetic acids. It is through these differences that the present process achieves such elegant result as compared with the dealkylation encountered by these investigators.

Another feature of the present process is that this nitration reaction can be carried out very smoothly and in short periods of time provided that the particular reaction conditions hereinafter specified are observed. For example, yields in the order of about 80 percent of 4-nitro-2,6-di-tert-butyl phenol of a purity in the range of about 95 to 97 percent have been achieved in the present process. Moreover, these reaction conditions sharply reduce competing reactions which lead to the formation of other products. For example, the preferred reaction conditions of this invention result in the formation of only a minor amount of 3,3',5,5'-tetraalkyldiphenoquinones which are normally formed by mildly oxidizing 2,6-dialkyl phenols.

A preferred embodiment of this invention is the preparation of 4-nitro-2,6-di-tert-alkyl phenols, which comprises nitrating a 2,6-di-tert-alkyl phenol with nitric acid under controlled conditions in the presence of a liquid aliphatic hydrocarbon reaction solvent. As pointed out above, the preparation of 4-nitro-2,6-dialkyl phenols by prior art nitration procedures has heretofore been virtually impossible because the tertiary alkyl groups are so readily torn away from the phenol by these procedures. However, according to this preferred embodiment, the reaction proceeds especially readily and these dealkylation difficulties are not encountered. For example, very good results are achieved in the preparation of 4-nitro-2,6-di-tert-butyl phenol.

The process of this invention is carried out at a temperature ranging from about 0 to about 40° C., the best results being obtained in a temperature range of 20 to 30° C. The nitric acid should range in concentration from 30 to 70 percent, preferably from about 30 to 40 percent. Generally speaking, the most satisfactory results are obtained with from 1.5 to 2.0 theories of nitric acid based on the amount of the 2,6-dialkyl phenol used.

The inert liquid hydrocarbon solvent can be a paraffinic hydrocarbon or mixture thereof, such as any of the liquid isomers of hexane, heptane, octane, nonane, decane, dodecane, and the like. These paraffinic hydrocarbons are, as pointed out above, preferably used when nitrating a 2,6-di-tert-alkyl phenol. Isooctane is a very useful solvent in this respect because it is readily available at low cost. The hydrocarbon solvent can also be an aromatic hydrocarbon or mixture thereof so long as it is a liquid at the reaction temperatures. Typically useful aromatic hydrocarbons are benzene, the various toluenes, the xylenes, and the like. Generally speaking, the best results are obtained when 90 to 110 milliliters of the solvents are used per each 50 grams of the 2,6-dialkyl phenol.

The 4-nitro-2,6-dialkyl phenol is readily separated from the reaction mixture by conventional means, such as filtration, centrifugation, decantation, reduced pressure distillation and like procedures. Optional work-up procedures involve the use of washing techniques, e. g., washing the product with fresh hydrocarbon preferably of the type used as the reaction solvent, followed by aqueous washes. It is also helpful to wash the product with an aqueous solution of a weak base, such as sodium bicarbonate, potassium bicarbonate, etc., so as to neutralize any residual nitric acid. The nitro compound is then dried in any suitable fashion using conditions which avoid the possibility of thermal deterioration of the product.

According to the process of this invention, the best results are obtained when the 2,6-dialkyl phenol is first dissolved in the hydrocarbon solvent and then the resultant solution added to the nitric acid while maintaining the temperature in the range specified above. However, good results are also achieved by introducing the nitric acid into a solution of the phenol in the reaction solvent or by introducing the phenol into a mixture of the solvent and nitric acid. It is also possible to carry out this process by introducing the reactants and the solvent concurrently into the reaction zone.

The manner of carrying out the present process and the excellent results achieved therefrom will be further apparent from the following specific examples in which all parts and percentages are by weight unless otherwise specified.

EXAMPLE 1

*Preparation of 4-nitro-2,6-di-tert-butyl phenol.*—In a reaction vessel equipped with stirring, condensing, temperature regulating and reagent introducing means was placed a solution of 103 parts of 2,6-di-tert-butyl phenol in 350 parts of isooctane. Over a period of 11 minutes 63 parts of 50 percent nitric acid was added at 20° C. The temperature was kept below 30° C. and after two minutes, a solid began to precipitate. The stirring was continued until a temperature drop was noted and then the solids were filtered off. This material was washed very thoroughly with water and dried to give 62.4 parts (50 percent yield) of crude 4-nitro-2,6-di-tert-butyl phenol, M. P. 145–153° C. This material crystallized from isooctane as white needles, M. P. 155.5–156° C. *Analysis.*—Calculated for $C_{14}H_{21}NO_3$: 66.91% carbon; 8.42% hydrogen and 5.57% nitrogen. Found: 67.20% carbon; 8.36% hydrogen and 5.53% nitrogen. The molecular weight was found to be 257 with the theoretical being 251.3.

EXAMPLE 2

*Preparation of 4-nitro-2-isopropyl-6-tert-butyl phenol.*—Into a reaction vessel is charged 60 parts of 70 percent nitric acid and 45 parts of water. To this is added with cooling and agitation 110 parts of 2-isopropyl-6-tert-butyl phenol dissolved in 50 parts of n-hexane. The temperature is maintained at 25–30° C. The reaction mixture is filtered and washed with water, a dilute aqueuos sodium bicarbonate solution and cold hexane. This product is 4-nitro-2-isopropyl-6-tert-butyl phenol.

EXAMPLE 3

*Preparation of 4-nitro-2-(2-decyl)-6-tert-amyl phenol.*—Using the procedure as described in Example 1 a total of 76 parts of 2-(2-decyl)-6-tert-amyl phenol in 150 parts of benzene is treated with 32 parts of 50 percent nitric acid. The temperature is kept below 30° C. and the solids formed are filtered off, washed thoroughly and dried to give 4-nitro-2-(2-decyl)-6-tert-amyl phenol.

EXAMPLE 4

*Preparation of 4-nitro-2,6-diisopropyl phenol.*—In the reaction vessel described in Example 1 was placed a solution of 76 parts of 2,6-diisopropyl phenol in 150 parts by volume of isooctane. To this solution was added 32 parts of 50 percent nitric acid while keeping the temperature below 30° C. The reaction mixture was filtered and the solids thereby recovered were washed thoroughly with water and dried to give 26 parts (47 percent yield) of 4-nitro-2,6-diisopropyl phenol, M. P. 115–117° C. These solids were crystallized from isooctane to give white needles, M. P. 117–118° C. *Analysis.*—Calculated for $C_{12}H_{17}NO_3$: 64.55% carbon; 7.38% hydrogen. Found: 64.60% carbon; 7.68% hydrogen.

To further show the excellent results achieved by the practice of this invention, an extended series of experiments was carried out on the nitration of 2,6-di-tert-butyl phenol. The conditions of these experiments and the results obtained are tabulated below.

*Table.—Preparation of 4-nitro-2,6-di-tert-butyl phenol*

| Ex. | HNO₃ Conc., Percent | Percent Theory of HNO₃ | Solvent | Reaction Temp., °C. | Reaction Time, min. | Cook Temp., °C. | Cook Time, min. | Yield of 4-nitro-2,6-di-tert-butyl phenol, Percent |
|---|---|---|---|---|---|---|---|---|
| 5 | 70 | 200 | Isooctane | 5–10 | 8 | 5–8 | 1 | 52.8 |
| 6 | 70 | 150 | do | 10–15 | 5 | 5–10 | 15 | 62 |
| 7 | 70 | 200 | do | 5–10 | 25 | 10–15 | 15 | 66.5 |
| 8 | 50 | 200 | Benzene | 20–25 | 15 | 20–22 | 1 | 65 |
| 9 | 50 | 200 | Heavy alkylate | 20–25 | 20 | | 5 | 71.1 |
| 10 | 45 | 200 | Isooctane | 30–35 | 15 | | 5 | 80.3 |
| 11 | 40 | 200 | do | 20–25 | 15 | | 15 | 76.3 |
| 12 | 50 | 200 | do | 20–25 | 15 | | 5 | 72.7 |
| 13 | 40 | 200 | Hexane | 25–30 | 22 | | 10 | 79.4 |
| 14 | 40 | 200 | do | 25–30 | 22 | | 10 | 80.2 |

In the above tabulated experiments, Examples 5, 6, 8 and 9 were carried out by dissolving 2,6-di-tert-butyl phenol in the solvent and feeding the nitric acid into the resultant solution under the specified conditions. On the other hand, Experiments 7 and 10–14 were conducted by introducing the hydrocarbon solution of the phenol into the nitric acid. It will be noted that in all cases this latter procedure is preferable, inasmuch as higher yields of 4-nitro-2,6-di-tert-butyl phenol were obtained. Another advantage of this preferred procedure is that it provides better control of the reaction temperature.

On the basis of the above and other experiments, the following is a recommended procedure for obtaining the best results in the practice of this invention when it is carried out on a large scale:

(1) In a reaction vessel, preferably a stainless steel, jacketed kettle open at the top and equipped with a high-speed, propellor-type stirrer, is placed 45 parts by weight of 70 percent nitric acid and 34 parts by weight of water giving a 40 percent nitric acid solution. However, as pointed out above, the nitric acid concentration may range from 30 to 70 percent. It has been found that the reaction rate is directly proportional to the nitric acid concentration—i. e., the stronger the acid, the more rapid is the reaction rate.

(2) In a separate container, approximately 50 parts by weight of the 2,6-dialkyl phenol is dissolved in 55 parts by weight of a paraffinic hydrocarbon solvent, preferably one or a mixture of hydrocarbons boiling in the range of from 60 to 150° C.

(3) While the nitric acid is being vigorously stirred, the 2,6-dialkyl phenol solution is fed into the acid while maintaining the temperature between 25 and 30° C. After 5 to 10 percent of this solution has been fed to the nitric acid, the feed is stopped to be sure that a yellow precipitate has formed. When it has been formed, the addition is continued. The rate of addition should be slow enough that a solid phase is present at all times.

(4) If the reaction mixture becomes lumpy, additional hydrocarbon solvent should be added.

(5) The reaction mixture is quenched with 50 parts by weight of water.

(6) The reaction mass is cooled to 10° C. and the product filtered off.

(7) The product is washed with 60 parts by weight of water.

(8) The product is washed with 75 parts by weight of water containing 3 parts by weight of sodium bicarbonate.

(9) The product is washed twice with 50 parts by weight of the hydrocarbon solvent in each wash.

(10) The product is washed at least four times with individual portions of water of approximately 60 parts by weight each.

(11) The product is dried in shallow trays in slow circulating air at about 50° C.

By observing the above procedural steps, approximately 80 percent yields of the 4-nitro-2,6-dialkyl phenol are obtained.

Another feature of the present process is its non-hazardous nature. For example, a nitration of 2,6-di-tert-butyl phenol was purposely allowed to go out of control by letting the reaction temperature reach 80° C. But even at this temperature, no violent fume-off was observed. Thus, when carrying out the reaction on a large-scale, operating personnel are not subjected to hazardous conditions. However, it is desirable from the standpoint of observing conditions of maximum safety to use an open nitration vessel and to have readily available a large volume of water for rapid quenching of the reaction mixture should the reaction become uncontrollable.

EXAMPLE 15

*Preparation of 4-amino-2,6-di-tert-butyl phenol.*—To a rocking autoclave was charged the following mixture: 25.1 parts of 4-nitro-2,6-di-tert-butyl phenol, 3.0 parts of ground platinum-on-silica gel catalyst and 105 parts of absolute ethanol. The autoclave was sealed, pressured to 200 p. s. i. g. with hydrogen and heated to 105° C. While maintaining the temperature at this level and operating at 300–500 p. s. i. g. of hydrogen, a total pressure drop of 780 p. s. i. was observed over a one-hour period. The autoclave was cooled, opened and the contents immediately filtered by suction to remove the catalyst. The solvent was removed from the red filtrate at reduced pressure. The crude 4-amino-2,6-di-tert-butyl phenol, which remained, weighed 20.5 parts (93 percent theory). Recrystallization from isooctane gave pink needles, M. P. 105–107° C. *Analysis.*—Calculated for $C_{14}H_{23}ON$: 76.1% carbon; 10.5% hydrogen. Found: 76.1% carbon; 10.3% hydrogen. Infrared analyses and volumetric analyses for nitrogen confirmed the structure of this compound.

Generally similar reaction conditions are used in the reduction and reductive alkylation of any of the products of this invention to form the corresponding amino or substituted-amino 2,6-dialkyl phenols.

These 4-amino- and 4-alkylamino-2,6-dialkyl phenols are especially useful as thermal stabilizers for jet fuel. In other words, when small amounts—0.001 to 0.5 percent by weight—of these amino compounds are dissolved in jet fuel, the resulting fuel composition can be subjected to elevated temperatures (300 to 500° F.) without undergoing thermally-induced deterioration. This enables the jet fuel to be used as a heat sink in operating jet engines to maintain effective lubricating oil cooling and the like. Thus, these amino compounds when used as jet fuel thermal stabilizers cause a considerable reduction in the amount of insoluble products formed when the jet fuels are subjected to these elevated temperatures. Hence, markedly reduced is the amount of insoluble thermal decomposition products which heretofore deposited to plug orifices in the fuel system, to distort fuel flow and thus impair flame pattern, and to foul surfaces.

Some of the amino compounds prepared from the products of the present process are also highly effective antioxidants for organic material normally susceptible to oxidative deterioration. Concentrations from about 0.001 to about 2 percent by weight of the material to be stabilized give very good results.

We claim:

1. The process of preparing 4-nitro-2,6-dialkyl phenols in which each alkyl group is branched on its alpha carbon atom, which comprises nitrating the corresponding 2,6-dialkyl phenol with 30 to 70 percent nitric acid at a temperature ranging from about 0 to about 40° C., the reaction being carried out in an inert liquid hydrocarbon solvent.

2. The process of preparing 4-nitro-2,6-di-tert-alkyl phenols which comprises nitrating the corersponding 2,6-dialkyl phenol with 30 to 70 percent nitric acid at a temperature ranging from about 0 to about 40° C., the reaction being carried out in an inert liquid hydrocarbon solvent.

3. The process of claim 2 where said solvent is a liquid aliphatic hydrocarbon.

4. The process of preparing 4-nitro-2,6-di-tert-butyl phenol which comprises introducing a solution of 2,6-di-tert-butyl phenol dissolved in a liquid aliphatic hydrocarbon into 30 to 40 percent nitric acid while maintaining the reaction temperature between about 20 and about 30° C.

References Cited in the file of this patent

UNITED STATES PATENTS 2,459,597     Stillson et al.  ---------- Jan. 18, 1949

OTHER REFERENCES

Schultz: Ber. deut. Chem., vol. 40 (1907), p. 4324.